United States Patent [19]

Shiokama

[11] Patent Number: 5,600,397
[45] Date of Patent: Feb. 4, 1997

[54] AUTOMATIC FOCUSING DEVICE

[75] Inventor: Yoshiharu Shiokama, Kawasaki, Japan

[73] Assignee: Nikon Corporation, Tokyo, Japan

[21] Appl. No.: 481,217

[22] Filed: Jun. 7, 1995

Related U.S. Application Data

[63] Continuation of Ser. No. 345,324, Nov. 21, 1994, abandoned, which is a continuation of Ser. No. 174,624, Dec. 28, 1993, abandoned, which is a continuation of Ser. No. 47,059, Apr. 6, 1993, abandoned, which is a continuation of Ser. No. 789,966, Nov. 12, 1991, abandoned.

[30] Foreign Application Priority Data

Nov. 14, 1990 [JP] Japan ................... 2-305993

[51] Int. Cl.⁶ ................................ G03B 13/36
[52] U.S. Cl. ................................ 396/133
[58] Field of Search ................ 354/400–409, 354/195.1, 195.12

[56] References Cited

U.S. PATENT DOCUMENTS

| | | | |
|---|---|---|---|
| 4,434,362 | 2/1984 | Wilwerding | 354/400 X |
| 4,482,234 | 11/1984 | Takagi et al. | 354/402 X |
| 4,525,053 | 6/1985 | Shiokama | 354/400 |
| 4,792,819 | 12/1988 | Akashi | 354/400 |

FOREIGN PATENT DOCUMENTS

| | | |
|---|---|---|
| 58-85406 | 5/1983 | Japan . |
| 58-85407 | 5/1983 | Japan . |
| 61-20845 | 5/1986 | Japan . |
| 2-118610 | 5/1990 | Japan . |

*Primary Examiner*—Russell E. Adams
*Attorney, Agent, or Firm*—Shapiro and Shapiro

[57] ABSTRACT

An automatic focusing device in which when a lens shifting range is arbitrarily limited and set with respect to the distance to a target object, the defocus amount and lens position are automatically detected, and the image plane shifting amount corresponding to the limited lens shifting range is calculated. Then, the corresponding image shifting amount and the detected defocus amount are compared. As a result of such comparison, if the defocus amount is found smaller, i.e., the target object is within the lens shift limiting range, the lens is shifted by the lens shifting amount thus calculated so as to perform focusing. If the defocus amount is found larger, i.e., the target object is outside the lens shift limiting range, the driving of the driving device is disabled so as not to shift the lens. If the defocus amount is found larger and the lens shifting is disabled, the defocus amount is again detected. The image shifting amount and lens shifting amount are calculated by the standard image plane shifting conversion coefficient and correction coefficient.

9 Claims, 4 Drawing Sheets

AUTOMATIC FOCUSING DEVICE

This is a continuation of application Ser. No. application Ser. No. 08/174,624 filed Dec. 28, 1993, which is a continuation of application Ser. No. 08/047,059 filed Apr. 6, 1993, which is a continuation of application Ser. No. 07/789,966 filed Nov. 12, 1991, all now abandoned.

BACKGROUND OF THE INVENTION

1. Field of the Invention

The present invention relates to an automatic focusing device for the use of picture photographing apparatus and others. More particularly, the invention relates to an automatic focusing device capable defining arbitrarily a lens shifting range when an automatic focusing is performed in a picture photographing apparatus and the like.

2. Related Background Art

Traditionally, as an automatic focusing device for the use of a picture photographing apparatus and the like, there has been a device using a system in which a range finding optical system is provided independent of a photographing optical system to detect a position where the contrast is the greatest by scanning from the infinite to the closest or a system in which a focus point is found by a trigonometrical surveying or the like thereby to shift the focusing optical system to such a position found.

In the former case, before the photographing optical system is driven, the entire range is scanned in advance. Therefore, when there is a limit defined to set the range of an object distance for the automatic focusing operation, it is comparatively easy to exclude any objects outside the defined range when the automatic focusing is attempted, (disclosed in Japanese Patent Publication No. 61-20845).

In the latter case, while a rapid automatic focusing is possible because the scanning of the entire range is not needed in measuring the distance, it is usually required to control the shift of the focusing optical system mechanically or the driving of a motor for the automatic focus drive using electrical control signals when a range of an object distance is limited for the automatic focusing operation, (disclosed in Japanese Patent Application Laid-Open No. 58-85406, Japanese Patent Application Laid-Open No. 58-85407, and others).

Meanwhile, in recent years, there have been proposed many automatic focusing devices using the so-called TTL phase difference detecting method in which the displacement of the images formed in the direction perpendicular to the optical axis by two light beams obtainable by dividing a beam transmitted through a photographing optical system is detected, and the defocus amount in the optical axis direction and the defocus direction are obtained in order to shift the focusing optical system for the performance of the automatic focusing.

In an automatic focusing device of the above-mentioned TTL phase difference detecting method, if the current position of the focusing optical system and the position where an object should be focused on an anticipated image formation plane are greatly apart to bring about a large defocus amount, the image contrast becomes low, thus making it impossible to detect the defocus amount. In such a case, the so-called scanning operation is needed so as to find a position where the contrast can be detected by driving the scan between the infinite and the closest in the focusing optical system.

In order to shorten a time required for such a scanning operation for a quicker focusing, a range limit is defined for the object distances for the automatic focusing operation so that no scanning operation is performed for a distance range where the possibility of the object presence is low, such as a region in the closest side having a high photographing magnification. For this purpose, the aforesaid method of controlling the shift of the focusing optical system mechanically or by the driving control of the motor for the automatic focusing drive using electrical control signals should be adequately usable.

However, there is another objective in defining the range limit for the object distances for the automatic focusing operation. Such a range limit is required in a case where another object is present on the same optical axis of the object of a specific target but at a different distance. In such a case, an object to be focused cannot be defined in an usual automatic focusing operation, hence making it impossible to focus on the object of the specific target. Therefore, the range limit of the object distances is set to define the object to be focused within such limit thereby to focus on the target object automatically. For example, there is a person over a wire netting, and when only the person should be focalized for photographing but not the wire netting, the distance farther from the position of the wire netting is set as a limit range. Then, the automatic focusing is reliably performed on the objective person but not on the wire netting, (disclosed in Japanese Patent Application Laid-Open No. 2-118610).

For this purpose, however, the conventional method of controlling the shift of the focusing optical system only is not sufficient. In other words, even when the limit range is set for a distance farther from the wire netting, there is a problem encountered in that the objective person cannot be focalized if an attempt is made to obtain the defocus amount with respect to the wire netting by securing the contrast of the image of the wire netting when the lens is positioned near the closest side limiting position in the limit range. At this position, the system tends to focus on the wire netting and the lens drive is performed towards the closest side.

SUMMARY OF THE INVENTION

The present invention is designed in consideration of the problems in the conventional art, and it is an object of the present invention to obtain an automatic focusing device which does not perform any automatic focusing on any object outside the limit range even if there exists in the outside of the limit range an object which is located at a position near the limit range.

It is another object of the present invention to provide an automatic focusing device comprising a defocus amount detecting means for detecting the defocus amount with respect to the anticipated image formation plane of the image of an object formed by a lens and the defocus direction; a lens position detecting means for detecting the aforesaid lens position; a range setting means for setting a desired shifting range of the aforesaid lens in the entire range for the lens to be shifted at the time of an automatic focusing irrespective of the current position of the aforesaid lens; a lens shifting amount calculating means for calculating the shifting amount of the aforesaid lens from its current position to an arbitrary position; an image plane shifting amount calculation means for calculating the image plane shifting amount and the defocus direction on the basis of the aforesaid lens shifting amount, and comparing the aforesaid defocus amount and the defocus direction; and a driving means for shifting the aforesaid lens on the basis of the aforesaid defocus amount and defocus direction to perform an automatic focusing, wherein the aforesaid automatic focusing device has a regulating means for regulating the aforesaid driving means so as to operate the aforesaid lens when the aforesaid defocus amount is not large as compared with the image plane shifting amount obtainable at the time of shifting the lens to the limited position in the side corresponding to the aforesaid defocus amount in the desired shifting range of the aforesaid lens, and not to operate the aforesaid lens when the aforesaid defocus amount is large as compared with the image plane shifting amount obtainable at the time of shifting the lens from the aforesaid focusing optical system at the time of the aforesaid defocus amount having been detected to the limited position in the side corresponding to the defocus direction in the desired shifting range of the aforesaid lens.

It is still another object of the present invention to provide an automatic focusing device in which the aforesaid detecting means detects again the aforesaid defocus amount when the aforesaid regulating means has regualted the aforesaid driving means not to operate.

It is a further object of the present invention to provide an automatic focusing device in which the aforesaid image plane shifting amount is calculated by the aforesaid image plane shifting amount calculating means on the basis of a specific image plane shifting amount conversion coefficient represented as a ratio of a fine shifting amount of the aforesaid image plane with respect to the fine-shifting amount of the aforesaid lens, and a correction coefficient which works out a general image plane shifting amount conversion coefficient by correcting the aforesaid standard image plane shifting amount conversion coefficient in accordance with the position of the aforesaid lens and defocus amount.

It is still a further object of the present invention to provide a photographing lens constituting a camera system with an automatic focusing device being arranged therein, wherein the aforesaid lens has at least the aforesaid lens position detecting means and driving means.

In the present invention, if a lens shifting range is arbitrarily limited and set with respect to a distance to a target object, the defocus amount, defocus direction, and lens position are automatically detected, and the image plane shifting amount with respect to the limited lens shifting range is calculated. Then, the detected defocus amount and defocus direction are compared with this image plane shifting amount with respect to the lens shifting range. As a result of the comparison, if the defocus amount is smaller, i.e., the target object is located within the lens shift limiting range, the lens is shifted as much as the calculated lens shifting amount to focus on the target object. If the resultant defocus amount is larger, i.e., the target object is outside the lens shift limiting range, the driving means is regulated not to drive so that the lens is not shifted.

Also, if the resultant defocus amount is larger and the lens shifting is regualted, the defocus amount is again detected.

The image shifting amount and lens shifting amount are calculated on the basis of the standard image plane shifting amount conversion coefficient and the corrected coefficient.

DESCRIPTION OF THE PREFERRED EMBODIMENTS

Hereinafter, in reference to the accompanying drawings the embodiments suited for the present invention will be described.

Now, referring to FIG. 1 and FIG. 2, the description will be made of a first embodiment according to the present invention.

Figure 1:
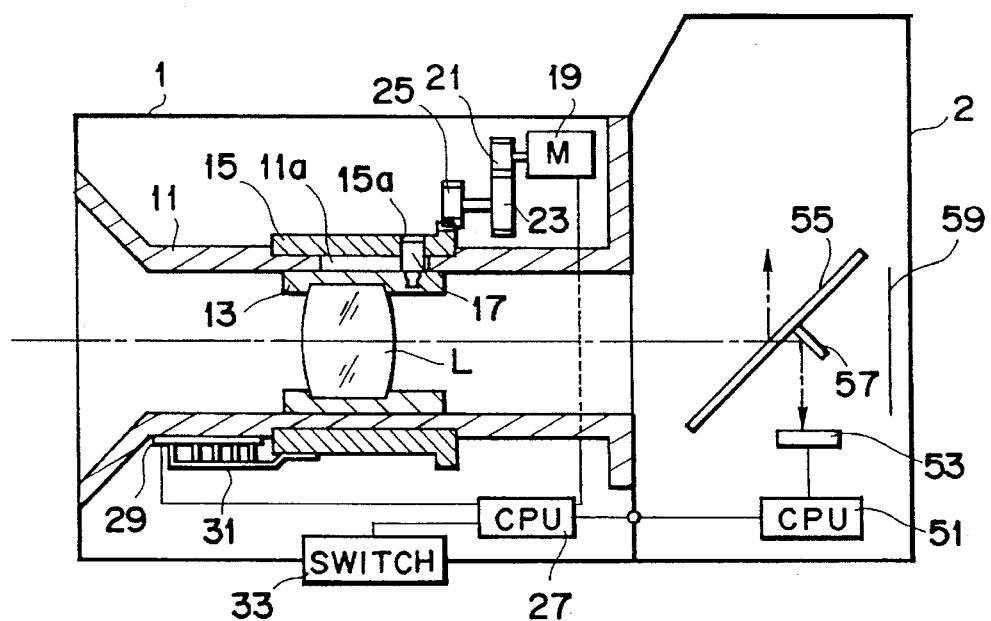
FIG. 1 is a schematic view illustrating the brief structure of a photographing lens adapting a first embodiment according to the present invention for a 35-mm single-lens reflex camera with an automatic focus driving motor incorporated therein.

FIG. 1 is a schematic view illustrating the brief structure of a photographing lens adapting the present embodiment for a 35-mm single-lens reflex camera with an automatic focus driving motor incorporated therein.

A photographing lens 1 and a camera body 2 constitute a picture photographing apparatus.

In the photographing lens 1, a lens holding member 13 for holding a lens L which forms a focusing optical system is held slidably along the inner face of the fixed barrel 11.

The light beam passing through the lens L is divided by the main mirror 55 comprising a half mirror of the camera body 2 into the beam which advances to a finder optical system (not shown) and the beam for the use of a ranging sensor. The beam for the use of the ranging sensor is reflected by a sub-mirror 57 to be conducted to the ranging sensor 53. In the ranging sensor 53, its photoelectric output corresponding to the image formed in the sensor is transmitted to a body microcomputer (hereinafter referred to as CPU) 51, and the body CPU 51 works out on the basis of the information thus transmitted the displacement amount of an image plane (the so-called defocus amount) of the current image formation plane with respect to a film plane 59 which is the anticipated image formation plane as well as the defocus direction.

The defocus amount and defocus direction thus worked out are transmitted to a lens microcomputer (hereinafter referred to as CPU) 27 through a mount (not shown) which electrically connects and fixes the photographing lens 1 and the camera body 2. The lens CPU 27 works out the lens shifting amount required for focusing with respect to the defocus amount and defocus direction thus transmitted, and drives a lens driving motor 19 for the amount needed to perform the focusing.

The driving power of the lens driving motor 19 is transmitted to a cam cylinder 15 through a speed reducing gear train 21, 23, and 25 to cause it to be rotated. The rotation of the cam cylinder 15 enables the lens holding member 13 and the lens L held thereby to be shifted through a cam groove 15a provided on the cam cylinder and a cam pin 17 planted on the lens holding member 13, which engages with a linear groove 11a provided on the fixed lens barrel 11. Thus, the automatic focusing operation is performed.

To the cam cylinder 15, the brush 31 for an encoder is fixed. The encoder brush 31 slides on the encoder circuit board 29 while being rotated integrally with the cam cylinder 15. As a result of this contact between the encoder circuit board 29 and encoder brush 31, the position of the lens L which is the focusing optical system is detected.

A switch 33 is the switch which serves to replace the lens shifting ranges.

Figure 2:
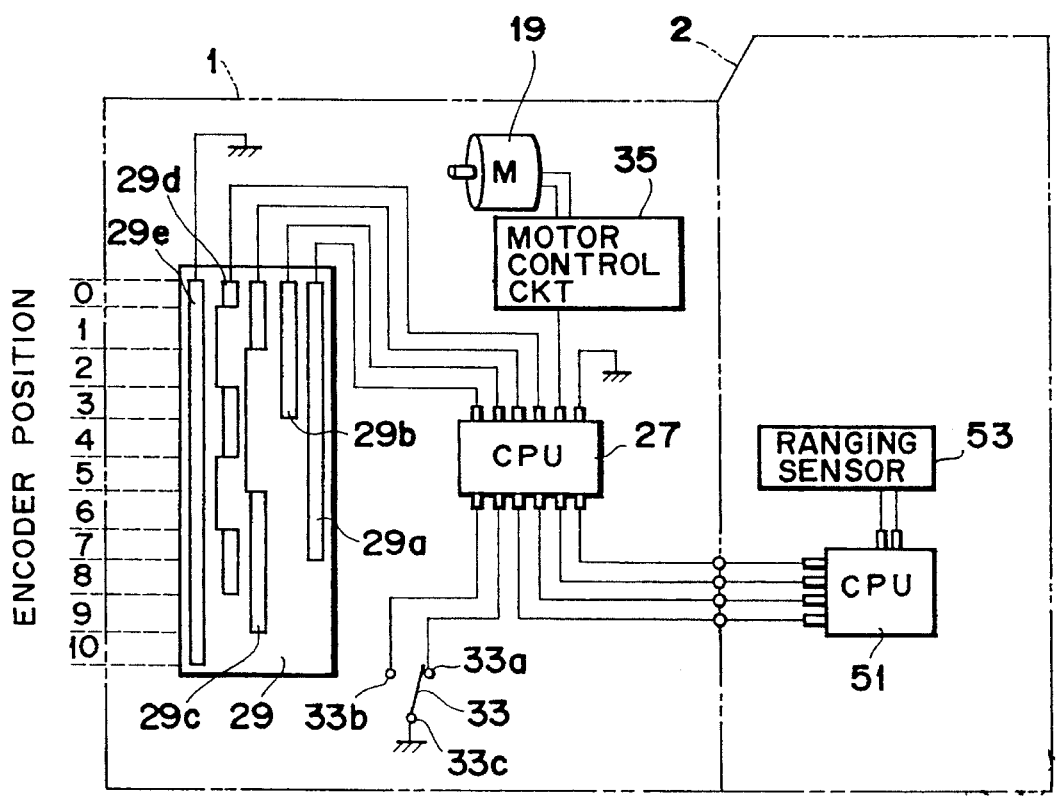
FIG. 2 is a view schematically showing the circuit construction of the first embodiment.

FIG. 2 is a view showing the circuit structure of the present embodiment.

The lens CPU 27 works out a lens shifting amount with respect to the defocus amount and defocus direction transmitted from the camera body 2 and a motor driving amount with respect thereto, and transmits these values to a motor driving control circuit 35. The motor driving control circuit 35 controls the driving of the motor 19 in accordance with the values thus transmitted. T the motor shaft, an encoder (not shown) is mounted to generate pulse signals in response to the rotational amount of the shaft. By feeding back the pulse signals to the motor driving control circuit 35, the motor driving and lens shifting are controlled by the amounts corresponding to the aforesaid defocus amount.

On the encoder circuit board 29, there are formed encoder conductive patterns 29a through 29d connected to the input ports of the lens CPU 27, and a pattern 29e which is grounded to the circuit ground level (0 v). The encoder brush 31 slides to turn on the encoder conductive patterns sequentially so as to detect the position of the lens L.

The switch 33 transmits to the lens CPU 27 two kinds of the states with respect to a lens shifting range. In other words, in a state where the pin 33a is in contact with the contacting piece 33 c which is grounded, the shifting range is restrained to the limited zone while in a state where the pin 33b is in contact with the contacting piece 33 c, the shifting range is selected for the entire zone, i.e., the total area from the infinite to the closest.

Now, in accordance with Table 1 and FIG. 3, the lens shifting range will be described.

Table 1 represents the relationship between the operating amounts and lens shifting regions, which shows the encoder positions where the encoder circuit board 29 and encoder brush 31 are in contact, the object distances, and the positions of the lens L.

As described earlier, the limits on the lens shifting regions are arranged in such a way that two zones can be selected. At first, when a limited zone is selected, the position 2 is set as the limited position in the infinite side while the position 7 is set as the limited position in the closest side. The lens L is traveled between the encoder positions 3 and 6 to perform focusing. This can be expressed in terms of the object distances such that an object existing within the distance L1 and distance L2 is in focus. Subsequently, when the total zone is selected, the lens travels in the entire region from the infinite to the closest to perform focusing, i.e., to perform an unlimited focusing shift.

Since there is a width in an encoder position, the data for the lens operating positions X0 through X10 stored in the memory of the lens CPU 27, which correspond respectively to each of the encoder positions 0 through 10 of the encoder 29, has a value representing its width.

Also, when the switch 33 is operated to set the shifting range, the limited position is stored in the memory of the CPU 27 as an operating amount X. For example, in a case where the limited zone is selected, the operating amount X2 is set as an operating amount limited in the infinite side. Xlim 1 while the operating amount X7 is set as an operating amount limited in the closest side Xlim 2. In a case where the total zone is selected, the operating mounts X0 and X10 are set as operating amounts limited respectively in the infinite side Xlim 1 and closest side Xlim 1.

Now, in accordance with FIG. 4, the focusing operation will be described.

Figure 4:
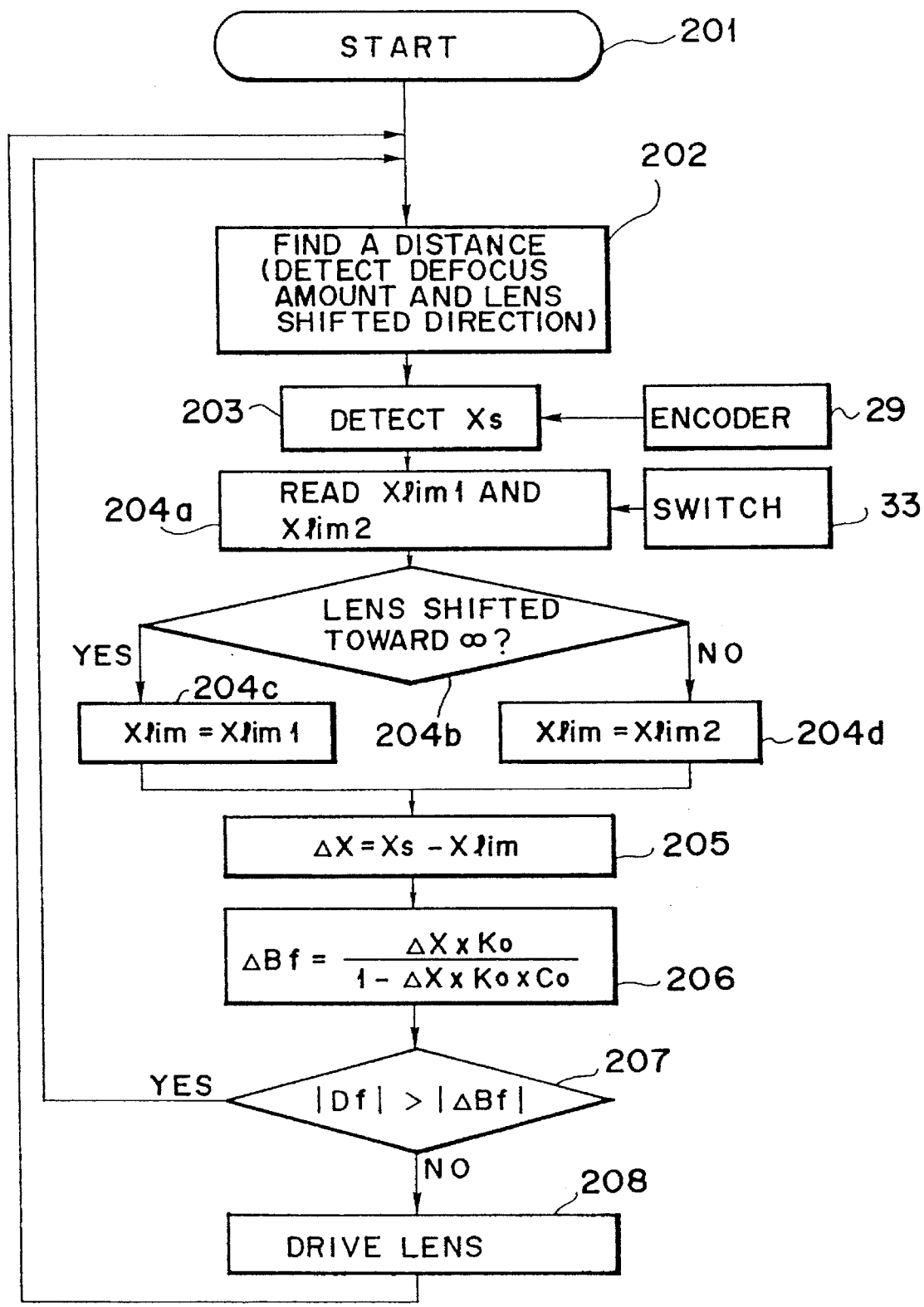
FIG. 4 is a flowchart illustrating the focusing operation of the first embodiment.

FIG. 4 is a flowchart illustrating the focusing operation of the present embodiment.

In step 201, the operation is started by depressing the release switch (not shown) of the camera body 2. In step 202, a ranging is performed to calculate the defocus amount Df and the defocus direction. Here, the defocus direction represents a direction in which the object can be focalized by driving the lens L either towards the infinite side or the closest side. Then, in step 203, the current position Xs of the lens L is detected on the basis of the signal from the encoder circuit board 29. In step 204a, the operating amounts Xlim 1 and Xlim 2 in the limited positions are read from the memory in accordance with the setting of the switch 33. Subsequently, in step 204b, whether the defocus direction leads to the infinite side or not is examined. If the defocusing is towards the infinite side, i.e., the case where the focusing is possible by driving the lens towards the infinite side in

TABLE 1

| Encoder position | 0 | 1 | 2 | 3 | 4 | 5 | 6 | 7 | 8 | 9 | 10 |
|---|---|---|---|---|---|---|---|---|---|---|---|
| Distance | ∞ Limited position | | L1 | | A | | C | L2 | D | | Closest limited position |
| Operating amount | x0 | x1 | x2 | x3 | x4 | x5 | x6 | x7 | x8 | x9 | x10 |
| Lens driving range | | | | ← | | Limited zone | | → | | | |
| | | ← | | | | Total zone | | | | | → |

Figure 3:
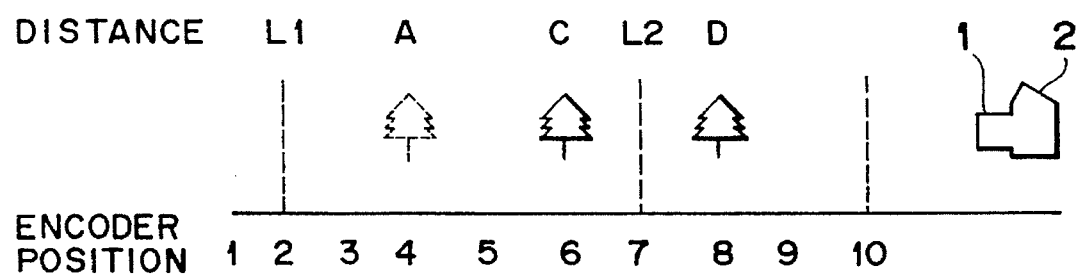
FIG. 3 is a view briefly showing the relationship between the encoder positions and object distances in the first embodiment.

FIG. 3 illustrates briefly the relationship between the encoder positions and object distances. In this respect, the encoder positions 0 and 10 are the zones in which the limited positions in the infinite and closest are electrically detected.

step 204c, the Xlim 1 is assigned to the value of Xlim. If the defocusing is not towards the infinite side, i.e., the case where the focusing is possible by driving the lens L towards the closest side, the Xlim 2 is assigned to the value of Xlim.

Then, in step 205, the lens shifting amount ΔX from the current position of the lens L to the limited position is calculated on the basis of the difference between the Xs and Xlim. In step 206, the image plane shifting amount ΔBf corresponding to the lens shifting amount ΔX is calculated therefrom in accordance with the equation shown in FIG. 4. Here, this relational equation, where Ko is "a specific image plane shifting amount conversion coefficient represented by the ratio of the fine shifting amount of the image plane to the fine shifting amount of the focusing lens" while Co is "a correction coefficient for correcting the Ko in accordance with the defocus amount", is introduced by modifying the equation for "converting a defocus amount to a focusing lens operating amount" disclosed in Japanese Patent Application Laid-open No. 62-170924.

In step 207, the absolute values of the defocus amount Df and the image plane shifting amount ΔBf are compared. Then, if the absolute value of the defocus amount Df is smaller, the object is judged to be located within the range limit, and the lens driving motor 19 is rotated to shift the lens L for perform focusing. If the absolute value of the defocus amount is larger, the object is judged to be located in the outside of the distance range limiting position, and the rotation of the lens driving motor 19 is disabled. Therefore, the lens L is not shifted and the ranging is repeated.

More specifically, taking the case where the lens shifting region is set within the limited zone as an example, the lens position Xs in FIG. 3 is a position corresponding to the distance A, and assuming that the limited position range is a distance L1 in the infinite side and a distance L2 in the closest side, the lens shifting amount ΔX and image plane shifting amount ΔBf can be obtained because Xs=X4, Xlim 1=X2, and Xlim 2=X7 respectively. At this juncture, assuming that the object is at a position of the distance C where the defocus direction is in the closest side, a defocus amount Df-c between the distance A and distance C obtained by ranging is smaller than an image shifting amount from the current lens position A to the limited position in the closest side L2 obtained on the basis of the operating amount Xs of the current lens position A and operating amount Xlim 2 of the limited position in the closest side L2. Therefore, the focusing operation is performed. Also, assuming likewise that the object is at a position of the distance D where the defocus direction is in the closest side, a defocus amount Df-d between the distance A and distance D obtained by ranging is larger than the aforesaid image plane shifting amount ΔBf. Therefore, the focusing operation is not performed and the ranging is repeated. When the object is at the distance D such as in this instance, the lens L is driven towards the closest side to stop at its limited deposition (the position of the encoder position 5) if the focusing operation is not regulated. Consequently, the lens is wastefully driven towards the object at the distance D.

Now, in accordance with Table 2, a second embodiment will be described.

The Table 2 represents an embodiment in which the data of the image plane shifting amount ΔBf up to the limited position of the lens shifting region is stored in the lens CPU 27 for each of the encoder positions. The reference marks indicating the data of image plane shifting amounts in the Table 2 designate each data as given below. For example, a numeral 4 represented as numerator of Bf4/7 indicates that the lens is at the position 4 while a numeral 7 represented as denominator thereof indicates that the limited position is set at the position 7, and the Bf4/7 represents an image shifting amount up to the limited position in such a state as this.

In this respect, the structure of the present embodiment is the same as that of the first embodiment.

In the case of the present embodiment, the operations at the steps 203,204, 205, and 206 in the flowchart shown in FIG. 4 are not required. The operation is started when the release switch (not shown) in the camera body 2 is depressed in step 201. Then, in step 202, the ranging is performed in order to calculate the defocus amount Df and the defocus direction. In step 207, the defocus amount Df and defocus direction are compared with the image plane shifting amount ΔBf corresponding to the aforesaid defocus direction read from the lens CPU 27. If the defocus amount Df is smaller, the object is judged to be within the distance region, so that the lens driving motor 19 is rotated to shift the lens L to perform focusing. If the defocus amount Df is larger, then the object is judged to be in the outside of the distance region limiting position. Thus, the rotation of the lens driving motor 19 is disabled so as not to shift the lens L, and the ranging is repeated.

TABLE 2

| Encoder position | 0 | 1 | 2 | 3 | 4 | 5 | 6 | 7 | 8 | 9 | 10 |
|---|---|---|---|---|---|---|---|---|---|---|---|
| Distance | ∞ Limited position | | L1 | | A | | C | L2 | D | | Closest limited position |
| Operating amount | x0 | x1 | x2 | x3 | x4 | x5 | x6 | x7 | x8 | x9 | x10 |
| Zone switching | | ∞ Image shifting amount to the limited position in the ∞ side | | | | | | | | | |
| Limited | | | Bf 2/2 | Bf 3/2 | Bf 4/2 | Bf 5/2 | Bf 6/2 | Bf 7/2 | | | |
| Total | Bf 0/0 | Bf 1/0 | Bf 2/0 | Bf 3/0 | Bf 4/0 | Bf 5/0 | Bf 6/0 | Bf 7/0 | Bf 8/0 | Bf 9/0 | 10/0 |
| | Image shifting amount to the limited position in the closest side | | | | | | | | | | |
| Limited | | | Bf 2/7 | Bf 3/7 | Bf 4/7 | Bf 5/7 | Bf 6/7 | Bf 7/7 | | | |
| Total | Bf 0/10 | Bf 1/10 | Bf 2/10 | Bf 3/10 | Bf 4/10 | Bf 5/10 | Bf 6/10 | Bf 7/10 | Bf 8/10 | Bf 9/10 | Bf 10/10 |
| Lens driving range | | | | Limited zone | | | | | | | |
| | | Total zone | | | | | | | | | |

Subsequently, in accordance with FIG. 5 and FIG. 6, a third embodiment will be described.

Figure 5:
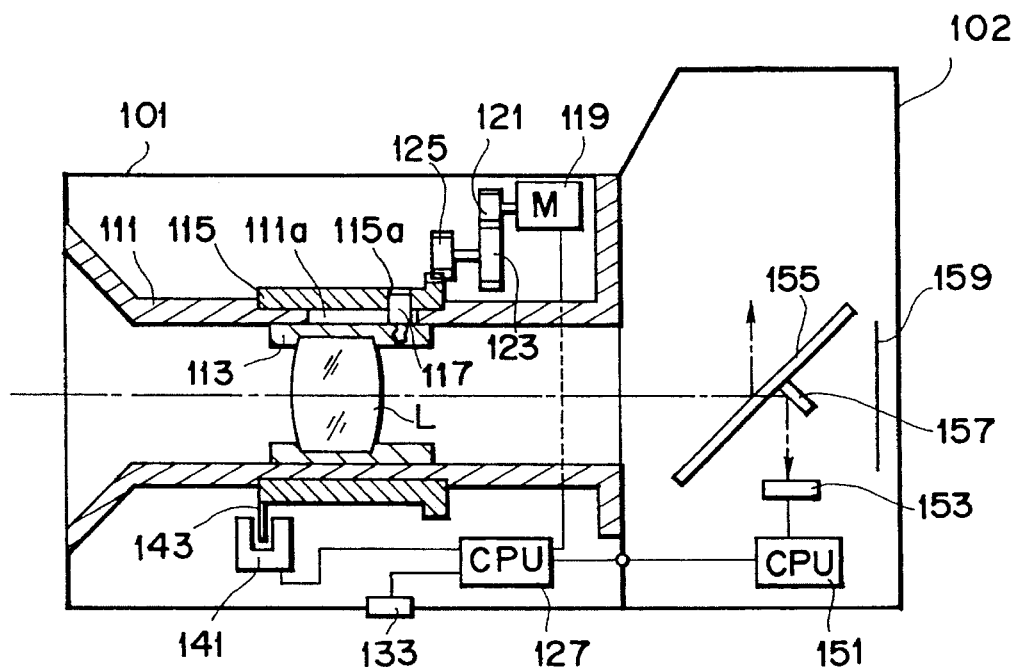
FIG. 5 is a schematic view illustrating the brief structure of the photographing lens, to which a third embodiment according to the present invention is applied.

FIG. 5 is a view schematically showing the brief structure of a photographing lens for a 35-mm single-lens reflex camera with an automatic focus driving motor incorporated the rein, to which the present embodiment is applied.

Figure 6:
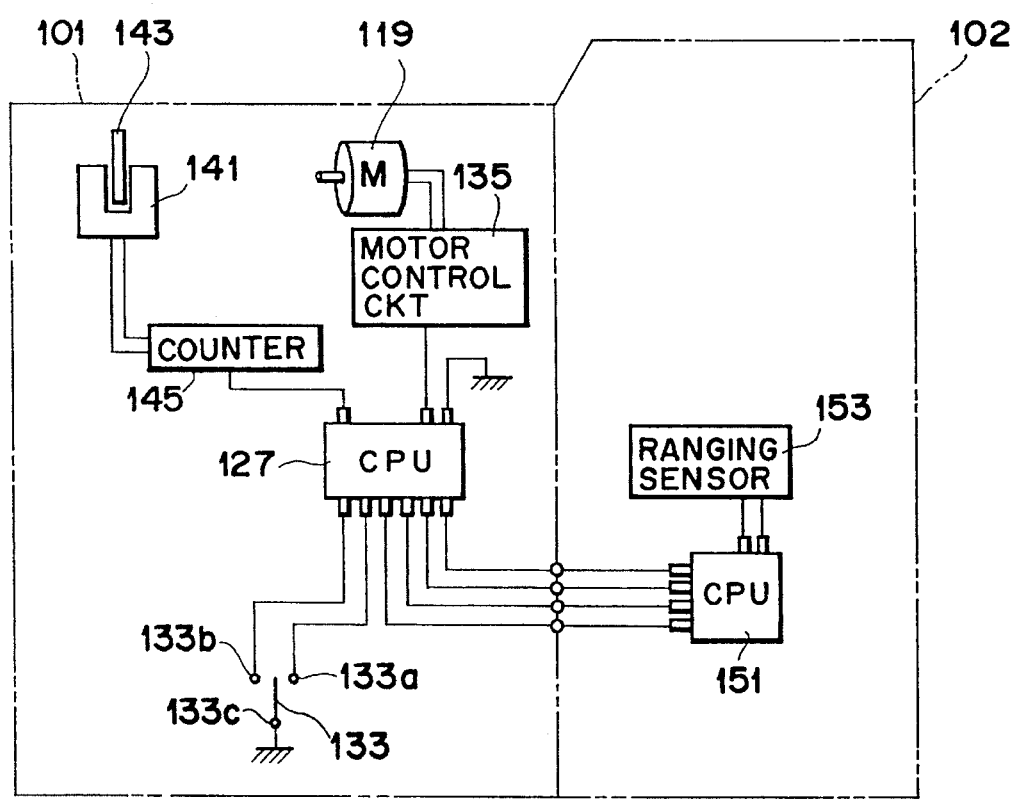
FIG. 6 is a view schematically showing the circuit construction of the third embodiment.

FIG. 6 is a view illustrating the circuit structure of the present embodiment.

In the present embodiment, the position of the lens L is not represented in terms of the operating amount from the film plane. The image plane shifting amount ΔBf is obtained by the encoder which detects the position of the lens L relatively. However, as the fundamental structure and operation thereof are the same as the first embodiment, the numerals which designate the same members are such as those appearing in FIG. 1 and FIG. 2 plus 100 each. Also, the descriptions of the same points are simplified or omitted.

Now, pulse signals corresponding to the rotation of the cam cylinder 115 are generated by an encoder plate 143 fixed to the cam cylinder 115 with a plurality of slit type transparent and opaque sections radially arranged therein, and a photointerrupter 141 with a light emitting diode and photoelectric conversion element being arranged oppositely thereon. The pulse signals thus generated are inputted into a counter 145. This counter 145 can count pulses from an arbitrary position relatively. The CPU 127 inputs the counting value as required.

The switch 133 which sets the lens shifting range can set at an arbitrary position the limited position in the infinite side and in the closest position independently. In other words, the counted value of the counter 145 at the time of the pin 133a being in contact with the contacting piece 133c is stored in the CPU 127 as a limited position in the infinite side. The counted value of the counter 145 at the time of the pin 133b being in contact is stored in the CPU 127 as a limited position in the closest side.

Now, since the data for the lens shifting amount per one counter pulse is stored in the memory in the CPU 127 in advance by the difference between the counted value at the current position where the ranging of the lens L has been performed and the counted value indicating each of the limited positions, the required lens shifting amount ΔX can be obtained immediately with omission of the calculation in the step 205 in the flowchart shown in FIG. 4. Further, if the data for the image plane shifting amount per one counter pulse is stored in the lens CPU 127, it should be possible to obtain an image shifting amount ΔBf immediately.

The operations are the same as those in the first embodiment after the values ΔX or ΔBf has been obtained. Therefore, the descriptions thereof will be omitted.

According to the present embodiment, it is possible to set a lens shifting range arbitrarily, variably, and precisely.

In the above-mentioned three embodiments, while the descriptions have been made of the automatic focusing device for the photographing lens of a 35-mm single-lens reflex camera with a focusing motor incorporated therein, the present invention is not limited thereto.

Also, as regards the detecting method of the lens positions, two embodiments have been shown, but it may be possible to detect the lens positions by methods other than those two.

In the first embodiment, although the distance limiting range is set for two, the limited zone and total zone, it is possible to set many more zones. Meanwhile, it may be possible to adopt a method to limit only either one of the infinite side or the closest side.

In the step 207 in FIG. 4, the comparison of the relative values of the image plane shifting amount ΔBf and the defocus amount Df is made simply by the comparison of the calculated values themselves. However, it may be possible to compare the relative values after having shifted these values in order to provide more margin in consideration of any possible detection error in the defocus amount as well as the encoder precision, and the like.

According to the present invention as set forth above, when a lens shifting range is arbitrarily limited and set with respect to the distance to a target object, the defocus amount and lens position are automatically detected and the image plane shifting amount corresponding to the limited lens shifting range is calculated. Then, the corresponding image shifting amount and the detected defocus amount are compared. As a result of such comparison, if the defocus amount is found smaller, i.e., the target object is within the lens shift limiting range, the lens is shifted by the lens shifting amount thus calculated so as to perform focusing. If the defocus amount is found larger, i.e., the target object is in the outside of the lens shift limiting range, the driving of the driving device is disabled so as not to shift the lens. Therefore, the operation of the automatic focusing is performed without any unnecessary actions and a rapid focusing is possible.

Also, if the defocus amount is found larger and the lens shifting is disabled, the defocus amount is again detected, hence making it possible to avoid any wasting actions and focus on the target object quickly. As a result, the operating sensibility is enhanced while saving the consumption of the battery energy.

Also, the image plane shifting amount is calculated by the standard image plane shifting conversion coefficient and the correction coefficient on the basis of the lens shifting amount. It is therefore possible to compare the image plane shifting amount and defocus amount highly precisely.

What is claimed is:

1. An automatic focusing device, comprising:

a defocus detecting portion which detects a defocus amount and a defocus direction with respect to an anticipated image formation plane of an image of an object formed by a lens;

a lens position detector which detects positions of said lens;

a range setting device to set a shifting range of said lens to a selected limited range within a larger total range in which said lens can travel to perform automatic focusing;

a lens drive to shift said lens based on said defocus amount and said defocus direction to perform automatic focusing, a lens shifting amount determining portion which determines a lens shifting amount required to shift said lens in a lens shifting direction, corresponding to said defocus direction, from a detected position of said lens within said limited range to a limit position of said limited range, said lens shifting amount determining portion determining said required lens shifting amount and said lens shifting direction based on said detected lens position within said limited range and said defocus direction;

an image plane shifting amount determining portion which converts said required lens shifting amount to an image plane shifting amount and compares said image plane shifting amount with said defocus amount; and a regulating portion which regulates said lens drive such that when said defocus amount is less than the determined image plane shifting amount, said lens drive is enabled to shift said lens, and when said defocus amount is greater than the determined image plane shifting amount, said lens drive is disabled from shifting said lens.

2. An automatic focusing device according to claim 1, wherein said defocus detecting portion repeats the detection of said defocus amount and said defocus direction if said regulating portion disables said lens drive from shifting said lens.

3. An automatic focusing device according to claim 1, wherein said image plane shifting amount determining portion determines said image plane shifting amount based on a specific image shifting amount conversion coefficient representing a ratio of a fine shifting amount of said image plane to a fine shifting amount of said lens, and a correction coefficient for correcting said specific image plane shifting amount conversion coefficient in accordance with said defocus amount.

4. An automatic focusing device, comprising:

defocus detecting portion which detects a defocus amount and a defocus direction with respect to an anticipated image formation plane of an image of an object formed by a lens;

a lens position detector which detects positions of said lens;

a range setting device to set a shifting range of said lens to a selected limited range within a larger total range in which said lens can travel to perform automatic focusing;

a lens drive to shift said lens based on said defocus amount and said defocus direction to perform automatic focusing;

memory storing data of a lens shifting amount for each lens position within said limited range;

a lens shifting amount determining portion Which determines a lens shifting amount required to shift said lens in a lens shifting direction, corresponding to said defocus direction, from a detected position of said lens within said limited range to a limit position of said limited range, based on a difference between a lens shifting amount corresponding to said detected position of said lens within said limited range and a lens shifting amount corresponding to said limit position of said limited range;

an image plane shifting amount determining portion which determines an image plane shifting amount corresponding to said required lens shifting amount; and a regulating portion which regulate said lens drive such that when said defocus amount is less than the determined image plane shifting amount, said lens drive is enabled to shift said lens, and when said defocus amount is greater than the determined image plane shifting amount, said lens drive is disabled from shifting said lens.

5. An automatic focusing device according to claim 4, wherein said image plane shifting amount determining portions converts said required lens shifting amount to an image plane shifting amount for comparison with said defocus amount.

6. An automatic focusing device, comprising:

a defocus detecting portion which detects a defocus amount and a defocus direction with respect to an anticipated image formation plane of an image of an object formed by a lens;

a lens position detector which detects positions of said lens;

a range setting device to set a shifting range of said lens to a selected limited range within a larger total range in which said lens can travel to perform automatic focusing;

a lens drive to shift said lens based on said defocus amount and said defocus direction to perform automatic focusing;

memory storing data of image plane shifting amounts corresponding to lens shifting amounts required to shift said lens in a lens shifting direction, corresponding to said defocus direction, to a limit position of said limited range from the remaining lens positions within said limited range;

an image plane shifting amount determining portion which determines an image plane shifting amount corresponding to a detected lens position within said limited range, based on the lens shifting amount data corresponding to that detected lens position, and comparing the determined image plane shifting amount with said defocus amount; and a regulating portion which regulates said lens drive such that when said defocus amount is less khan the determined image plane shifting amount, said lens drive is enabled to shift said lens, and when said defocus amount is greater than the determined image plane shifting amount, said lens drive is disabled from shifting said lens.

7. An automatic focusing device comprising:

a defocus detecting portion which detects a defocus amount and a defocus direction with respect to an anticipated image formation plane of an image of an object formed by a lens;

a lens position detector which detects positions of said lens;

a range setting device to set a shifting range of said lens to a predetermined limited range within a larger total range in which said lens can travel to perform automatic focusing;

a pulse generator which generates pulses in accordance with shifting of said lens;

a pulse counting device which provides a pulse count based on pulses generated by said pulse generator;

memory for storing a pulse count corresponding to a limit position of said limited range;

a lens shifting amount determining portion which determines a lens shifting amount required to shift said lens in a lens shifting direction, corresponding to said defocus direction, from a detected position of said lens within said limited range to said limit position, based on a difference between a pulse count corresponding to said detected position of said lens and the stored pulse count corresponding to said limit position;

an image plane shifting amount determining portion which determines an image plane shifting amount corresponding to said required lens shifting amount; and a regulating portion which regulates said lens drive such that when said defocus amount is less than the determined image plane shifting amount, said lens drive is enabled to shift said lens, and when said defocus amount is greater than the determined image plane shifting amount, said lens drive is disabled from shifting said lens.

8. An automatic focusing device according to claim 7, wherein said image plane shifting amount determining portion converts said required lens shifting amount to an image plane shifting amount for comparison with said defocus amount.

9. An automatic focusing device, comprising:

- a defocus detecting portion which detects a defocus amount and a defocus direction with respect to an anticipated image formation plane of an image of an object formed by a lens;
- a lens position detector which detects positions of said lens;
- a range setting device to set a shifting range of said lens to a selected limited range within a larger total range in which said lens can travel to perform automatic focusing;
- a lens drive to shift said lens based on said defocus amount and said defocus direction to perform automatic focusing;
- a lens shifting amount determining portion which determines a lens shifting amount required to shift said lens in a lens shifting direction, corresponding to said defocus direction, from a detected position of said lens within said limited range to a limit position of said limited range, said lens shifting amount determining portion determining said required lens shifting amount and said lens shifting direction based on said detected lens position within said limited range and said defocus direction;
- an image plane shifting amount determining portion which determines an image plane shirting amount based on said required lens shifting amount;
- a comparison portion which compares a first value based on said image plane shifting amount to a second value based on said defocus amount; and
- a regulating portion which regulates said lens drive such that said lens drive is enabled to shift said lens and disabled from shifting said lens depending upon a difference between said first and second values.

* * * * *